United States Patent [19]

Bichara et al.

[11] Patent Number: 4,533,536

[45] Date of Patent: Aug. 6, 1985

[54] PROCESS FOR THE MANUFACTURE OF POTASSIUM SULPHATE BY TREATING SOLUTIONS CONTAINING MAGNESIUM CHLORIDE AND POTASSIUM CHLORIDE

[75] Inventors: Michel Bichara, Mulhouse; Emile Wendling, Morshwiller le Bas; Michel Bodu, Mulhouse, all of France

[73] Assignee: Mines de Potasse d'Alsace S.A., Mulhouse, France

[21] Appl. No.: 474,362

[22] Filed: Mar. 11, 1983

[30] Foreign Application Priority Data

Mar. 11, 1982 [FR] France ................. 82 04078

[51] Int. Cl.$^3$ .................. C01D 5/06; C01B 17/96; C01F 5/34
[52] U.S. Cl. .................... 423/551; 423/199; 423/166; 423/205; 423/499; 423/544; 23/298; 23/302 R; 23/303; 23/304
[58] Field of Search .............. 23/298, 300, 302 R, 23/303, 304; 423/166, 178, 191, 193, 205, 499, 551, 552, 199

[56] References Cited

U.S. PATENT DOCUMENTS

| 2,902,344 | 9/1959 | Cevidalli et al. | 423/551 |
| 3,058,806 | 10/1962 | Ebner | 423/552 |
| 3,528,767 | 9/1970 | Garrett | 423/551 |
| 3,687,638 | 8/1972 | Neitzel | 23/302 |
| 4,129,642 | 12/1978 | Neitzel | 423/197 |
| 4,306,880 | 12/1981 | Garrett | 23/295 S |

FOREIGN PATENT DOCUMENTS

| 552948 | 12/1956 | Italy | 423/552 |
| 587673 | 1/1959 | Italy | 423/552 |
| 261991 | 12/1926 | United Kingdom | 423/551 |
| 298535 | 6/1971 | U.S.S.R. | 423/551 |
| 716979 | 2/1980 | U.S.S.R. | 423/551 |
| 767030 | 9/1980 | U.S.S.R. | 423/552 |

Primary Examiner—Gary P. Straub
Attorney, Agent, or Firm—Millen & White

[57] ABSTRACT

Process for the manufacture of potassium sulphate from solutions containing magnesium chloride and potassium chloride from solutions, more particularly from mother liquors issuing from the treatment of carnallite. According to this process sodium sulphate and potassium chloride are added to the solutions so as to precipitate sodium chloride and schoenite ($K_2SO_4.MgSO_4.6H_2O$) and the schoenite is treated in a known manner to produce potassium sulphate.

6 Claims, No Drawings

PROCESS FOR THE MANUFACTURE OF POTASSIUM SULPHATE BY TREATING SOLUTIONS CONTAINING MAGNESIUM CHLORIDE AND POTASSIUM CHLORIDE

BACKGROUND OF THE INVENTION

The present invention relates to a process for the manufacture of potassium sulphate from solutions containing magnesium chloride, such as solutions of carnallite ore and, in particular, the equilibrium mother liquors of a unit for the treatment of carnallite.

Carnallite is a salt having the following composition: $KCl.MgCl_2.6H_2O$. It is found in solid form in a certain number of deposits, and it is present, in the form of impurities, in larger or smaller amounts, in a certain number of other potassium deposits. Otherwise, it can be crystallized from natural brines.

Whatever its origin, carnallite is brought into contact, for treatment, with a decomposition mother liquor having a content of $MgCl_2$, KCl and NaCl such that potassium chloride and sodium chloride (synthetic sylvinite) are precipitated in an equilibrium mother liquor. This equilibrium mother liquor is saturated with potassium chloride and sodium chloride, and it is more or less saturated with magnesium chloride.

This equilibrium mother liquor is frequently discarded, but, in that case, the potassium which it contains is lost and the potassium yield of the unit is poor. Attempts have been made to concentrate this equilibrium mother liquor in order to recover an additional amount of carnallite which is recycled. In practice, however, this evaporation is economical only to the extent that it can be carried out by natural evaporation, for example, in solar evaporation pools.

SUMMARY OF THE INVENTION

It is thus an object of the present invention to provide a a process for converting the potassium contained in these mother liquors, into potassium sulphate.

It is another object of the invention to manufacture potassium sulphate from potassium chloride via the intermediate production of schoenite, the sulphate ions being supplied by sodium sulphate.

DETAILED DISCUSSION OF THE INVENTION

It is known to prepare potassium sulphate from schoenite ($K_2SO_4.MgSO_4.6H_2O$), obtained either by the conversion of kainite ($KCl.MgSO_4.2/75H_2O$) or from magnesium sulphate and potassium chloride. This latter process is most frequently carried out at a temperature higher than ambient temperature.

It is also known to prepare potassium sulphate from sodium sulphate and potassium chloride. A double decomposition reaction between these two salts leads to the formation of sodium chloride and potassium sulphate. The latter combines with unreacted sodium sulphate to form a double sulphate, $Na_2SO_4.3K_2SO_4$ called glaserite. An additional amount of potassium chloride is added to this double salt, so as to produce potassium sulphate. The reactions are relatively slow and a residence time of several hours is required for the solid/liquid equilibria to be established.

The present invention relates to a process for the production of potassium sulphate from solutions containing magnesium chloride and potassium chloride, according to which sodium sulphate and potassium chloride are added to the solutions, so as to precipitate sodium chloride and schoenite, $K_2SO_4.MgSO_4.6H_2O$, and the schoenite obtained is treated in a known manner to produce potassium sulphate.

In other words, the process of the present invention enables potassium sulphate to be produced from KCl via the intermediate of schoenite, the sulphate ions being supplied by sodium sulphate.

In fact, it may be thought that, according to the present invention, a double decomposition reaction is brought about between sodium sulphate and magnesium and potassium chlorides, which could be written:

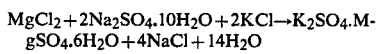

$$MgCl_2+2Na_2SO_4.10H_2O+2KCl\rightarrow K_2SO_4.MgSO_4.6H_2O+4NaCl+14H_2O$$

This double decomposition reaction between sodium sulphate and magnesium chloride is relatively fast, the equilibrium being established in two hours.

If the amount of sodium sulphate required and the whole of the amount of potassium chloride required are added in one single lot, a solid is precipitated, containing about 65 to 70% of schoenite and 30 to 35% of sodium chloride. The schoenite is subsequently concentrated by screening, by washing or, more particularly, by flotation.

A particularly advantageous process consists in carrying out the precipitation of the salts in two stages. In a first stage, the whole of the sodium sulphate required and, if appropriate, the minimum amount of potassium chloride required to ensure saturation of the solution or of the mother liquors, containing magnesium chloride, are introduced.

A solid is then precipitated, containing about 80 to 90% of sodium chloride. This solid is separated off by filtration or centrifugation. The amount of potassium chloride, required for obtaining a second precipitate containing from 85 to 95% of schoenite, is then added to the filtrate. This process is particularly advantageous since the schoenite content of this second precipitate is sufficiently high for simple washing to enable a product to be obtained which, by decomposition, directly supplies a potassium sulphate having a commercially customary $K_2O$ content, that is to say higher than, or equal to, 50%. In the presence of NaCl, $Na_2SO_4$ is formed by a secondary reaction during decomposition and glaserite ($Na_2SO_4.3K_2SO_4$) is precipitated at the same time as $K_2SO_4$.

The schoenite is treated in a known manner for recovering the potassium sulphate. For example, it may be decomposed at a temperature of 55° C. in the presence of water. After a residence time of about 2 hours, the reaction yields a precipitate of $K_2SO_4$ and a mother liquor rich in magnesium sulphate. The reaction may be written:

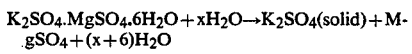

$$K_2SO_4.MgSO_4.6H_2O+xH_2O\rightarrow K_2SO_4(solid)+MgSO_4+(x+6)H_2O$$

The theoretical $K_2SO_4$ yield (mols of $K_2SO_4$/mols of schoenite) is 0.47. This yield can be increased by evaporation of the residual mother liquor, with precipitation of a fresh amount of schoenite which is then converted again to $K_2SO_4$.

The conversion of schoenite to potassium sulphate can also be carried out at ambient temperature by addition of potassium chloride according to the reaction:

$$K_2SO_4 \cdot MgSO_4 \cdot 6H_2O + 2KCl \rightarrow K_2SO_4 + MgCl_2 + H_2O$$

The sodium sulphate added to the solutions containing magnesium chloride can be anhydrous sodium sulphate or hydrated sodium sulphate, for example the decahydrate.

According to a preferred embodiment of the invention, the potassium chloride originates from the unit for the treatment of carnallite.

The required amounts of sodium sulphate and potassium chloride are worked out from the equilibrium diagrams. The composition of the starting solutions is calculated and the composition of the final mother liquor, which it is desired to obtain, is determined from the equilibrium diagrams.

If, for example, 1000 g of a mother liquor having the following composition:

$MgCl_2$: 289 g/liter or 62.2 mols/1000 mols of water,
$MgSO_4$: 52 g/liter or 8.8 mols/1000 mols of water,
KCl: 45 g/liter or 12.6 mols/1000 mols of water and
NaCl: 31 g/liter or 10.8 mols/1000 mols of water, is initially used, 409.4 g of $Na_2SO_4 \cdot 10H_2O$ and 118.5 g of KCl have to be added to produce 253.6 g of a solid consisting of 71.6% of schoenite and 28.4% of NaCl and 1274 g of a mother liquor having the composition:

$MgCl_2$: 32.0 mols/1000 mols of $H_2O$,
$MgSO_4$: 14.4 mols/1000 mols of $H_2O$,
NaCl: 36.0 mols/1000 mols of $H_2O$ and
KCl: 24.2 mols/1000 mols $H_2O$.

The addition of $Na_2SO_4$ and KCl to the solutions containing $MgCl_2$ takes place at atmospheric pressure and at ambient temperature.

The examples given below, without implying any limitation, will make the invention clearer.

EXAMPLE 1

500 cm³ of equilibrium mother liquors originating from the decomposition of a carnallite salt and having the following composition:

$MgCl_2$—289 g/liter,
$MgSO_4$—52 g/liter,
KCl—45 g/liter and
NaCl—31 g/liter,
are treated.

265 g of sodium sulphate decahydrate and 77 g of potassium chloride are added. The mixture is stirred for 90 minutes at 25° C. and the precipitate obtained is filtered off. 200 g of moist salt and 576 cm³ of filtrate are obtained. After drying, the recovered salt contains 68% of schoenite and 29.7% of sodium chloride.

EXAMPLE 2

265 g of sodium sulphate decahydrate are added to 500 cm³ of equilibrium mother liquors, having the same composition as in Example 1, and then the mixture is stirred for 30 minutes at 25° C. and filtered. 48.5 g of a first moist precipitate and a first filtrate are recovered. 76.7 g of KCl are added to this first filtrate and this new mixture is stirred for 60 minutes at 25° C. The reaction product is filtered off and 148.3 g of a moist salt of a second moist precipitate are thus recovered.

After drying (without washing, so as to displace the impregnation mother liquor) the precipitates have the following composition:

1st precipitate:
NaCl—94.5%
Schoenite—3.1%
KCl—0.6%
$MgCl_2$—1.8%

2nd precipitate:
Schoenite—86.2%
NaCl—7.8%
KCl—4.7%
$MgCl_2$—1.3%

EXAMPLE 3

500 g of schoenite salt, prepared according to the process described in Example 2 and having the composition:

schoenite—85.6%
NaCl—7.8%
($MgCl_2$+KCl)—6.6% are washed with 100 g of water at 25° C. for 10 minutes. After filtration, washing and drying, 381.1 g of a salt having the following composition are obtained:

schoenite—90%
$K_2SO_4$+KCl—9%
NaCl+$MgCl_2$—1%

EXAMPLE 4

500 g of washed schoenite, obtained in accordance with Example 2, are treated. 445 g of water are added to it and the mash obtained is stirred at 55° C. for 2 hours, so as to decompose the schoenite. After filtration, 117.2 g of a moist salt are obtained, which, after drying, has the following composition:

$K_2SO_4$—96.5% (that is 53.2% $K_2O$)
$MgSO_4$—2.8%
$MgCl_2$—0.4%
NaCl—0.3%

We claim:

1. In a process for the production of schoenite from an equilibrium mother liquor obtained from a process of treating carnallite to precipitate synthetic sylvinite, said equilibrium mother liquor consisting essentially of saturation quantities of potassium chloride and sodium chloride, a substantial-saturation quantity of magnesium chloride, and magnesium sulphate, wherein the schoenite is precipitated from said equilibrium mother liquor, the improvement which comprises in a first step adding sodium sulphate to said equilibrium mother liquor to form a precipitate containing mainly sodium chloride; separating said precipitate of sodium chloride from the resultant mother liquor; and in a second step adding potassium chloride to said resultant mother liquor to form a precipitate containing mainly schoenite.

2. A process according to claim 1, wherein the potassium chloride added in the second step is obtained from the process for the treatment of carnallite.

3. A process according to claim 1, wherein potassium sulphate is recovered from the said precipitate of schoenite.

4. A process according to claim 3, wherein the said precipitate of schoenite contains sodium chloride and is washed to separate sodium chloride prior to recovery of the potassium sulphate.

5. A process according to claim 3, wherein the schoenite is decomposed at a temperature of 55° C. in the presence of water.

6. A process according to claim 3, wherein the schoenite is decomposed at ambient temperature by addition of potassium chloride.

* * * * *